United States Patent [19]
Okada

[11] 3,750,102
[45] July 31, 1973

[54] SELF-RETRACTING TYPE SEAT BELT DEVICE FOR VEHICLE USE

[75] Inventor: Motohiro Okada, Tokyo, Japan

[73] Assignee: Honda Giken Kogyo Kabushiki Kaisha, Tokyo, Japan

[22] Filed: June 8, 1972

[21] Appl. No.: 260,732

[30] Foreign Application Priority Data
June 9, 1971   Japan.................................. 46/40799

[52] U.S. Cl............ 340/52 E, 307/10 SB, 180/82 C
[51] Int. Cl........................................... B60r 21/10
[58] Field of Search .......................... 340/52 E, 278; 307/10 SB; 180/82 C

[56] References Cited
UNITED STATES PATENTS
3,717,216    2/1973    Rothschild ....................... 180/82 C
3,712,401    1/1973    Rothschild ....................... 180/82 C FOREIGN PATENTS OR APPLICATIONS
237,466    9/1960    Australia ......................... 180/82 C

*Primary Examiner*—Alvin H. Waring
*Attorney*—Eric H. Waters et al.

[57] ABSTRACT

A self-retracting type seat belt device which is adapted to keep an appropriate slack in the seat belt applied around the user's body. The seat belt comprises a buckle including one buckle member movable on the vehicle body and normally biased to assume an extended position. The buckle member is temporarily retracted to lock the belt winder under the engaging pressure of the other buckle member secured to the free end of the seat belt when the belt is buckled up.

10 Claims, 6 Drawing Figures

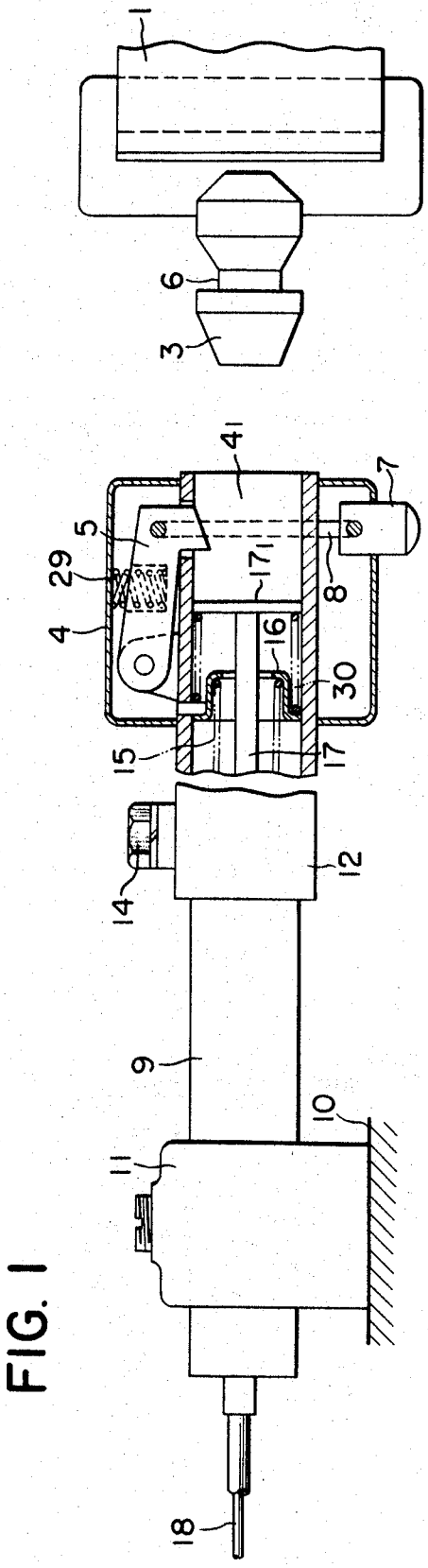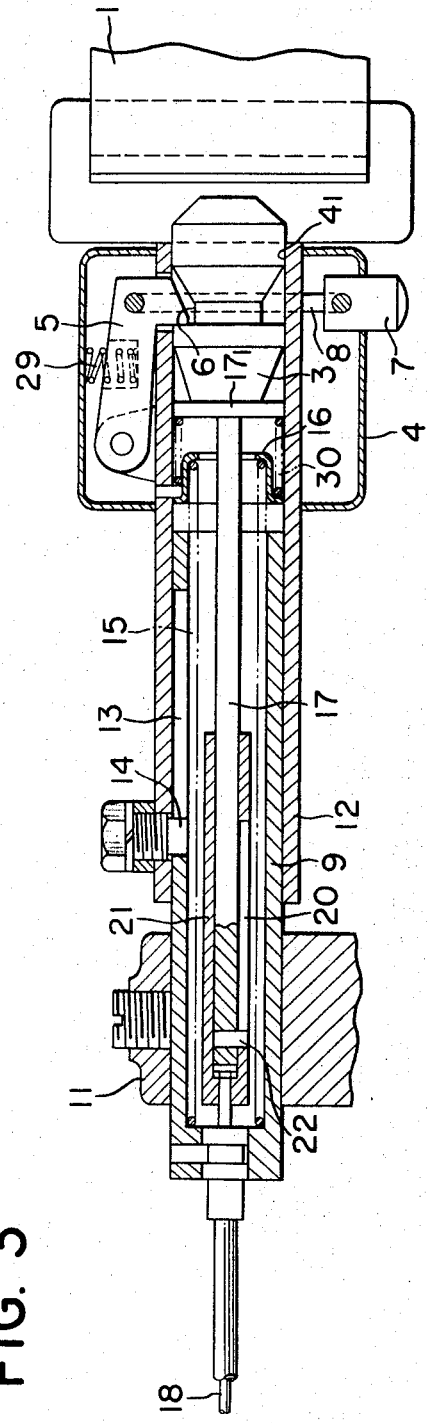

SELF-RETRACTING TYPE SEAT BELT DEVICE FOR VEHICLE USE

BACKGROUND a. Field of the Invention

The present invention relates to seat belt devices for use in automobiles, trucks and the like vehicles and more particularly to those of the self-retracting type including a belt winder operable under spring bias to wind up the seat belt for the purposes of facilitating its application around the driver or passenger and preventing it from lying idle on the seat when not used.

b. Prior Art

In known seat belt devices of the type described, however, the seat belt in use is at all times kept under an appreciable tension to press against the user's body and thus gives considerable discomfort.

SUMMARY OF THE INVENTION

Accordingly, the present invention has for its object the provision of a new and improved self-retracting type seat belt device which can be used at all times keeping an appropriate slack in the seat belt and thus without giving any discomfort to the user.

The seat belt device of the present invention is characterized in that it comprises buckle means including a first buckle member secured to the free end of the seat belt and a second buckle member arranged for back and forth movement over a predetermined distance relative to the associated portion of the vehicle body and biased to normally assume the forwardly extended position, the second buckle member being retractable under the pressure of the first buckle member to lock the spring-biased belt winder of the device when the first buckle member is engaged with the second buckle member in order to buckle up the seat belt previously pulled out around the user's body and restorable subsequently when released, to said extended position to slacken the seat belt.

The construction of the seat belt device of the present invention will next be described in detail with reference to the accompanying drawings, which illustrates one preferred embodiment of the invention.

BRIEF DESCRIPTION OF THE DRAWING

FIG. 1 is a fragmentary cross-sectional elevation view of the buckle structure of the seat belt device embodying the present invention, showing the structure in a disengaged state;

FIG. 3 is an elevational view similar to FIG. 1, showing the buckle structure in a position just engaged and temporarily displaced toward the associated portion of the vehicle body;

DETAILED DESCRIPTION

Figure 2:
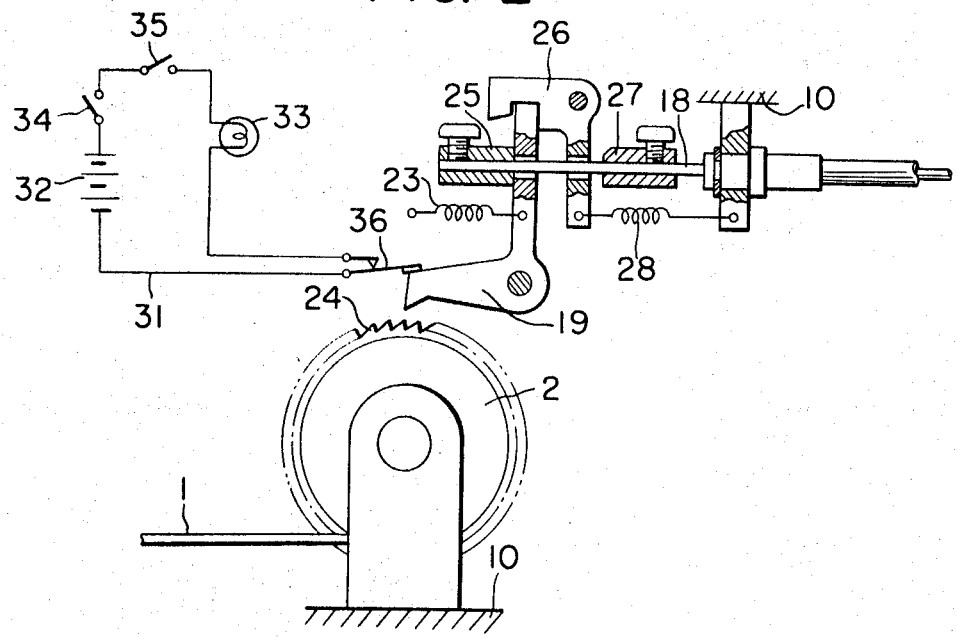
FIG. 2 is a partly schematic elevational view of the belt winder and associated portion of the device.

Referring to the drawings and particularly to FIGS. 1 and 2, reference numeral 1 indicates a seat belt anchored at one end to an automatic belt winder 2; numeral 3 indicates one buckle member of plug form secured to the free end of the seat belt 1; and numeral 4 indicates the other buckle member of a socket form, associated with the vehicle body. A pawled locking lever 5 is pivotally mounted in the socket member 4 and is normally biased downward by a spring 29. The socket member 4 also carries a push button 7 pivotally secured to the pawled lever 5 by a link 8. When the seat belt 1 is pulled out of the winder 2 and the buckle plug member 3 secured to the belt end is inserted into the opening 41 formed in the socket member 4, the pawled lever 5 operates to engage the plug 3 by entering a recess 6 in the plug 3 under the bias of spring 29. Upon depression of push button 7, the pawled lever 5 is moved by link 8 out of engagement with the plug 3 to allow the seat belt 1 to be automatically wound up. Such construction and operation of the device is generally similar to that of conventional self-retracting type seat belt devices.

The buckle structure of the device of the present invention further includes a fixed tube 9 secured to the vehicle body 10 by a bracket 11 and a movable tube 12 slidably fitted over the fixed tube 9.

The buckle socket member 4 is fixedly fitted to the free end of the movable tube 12, as shown. Reference numerals 13 and 14 respectively designate an axially extending slot formed in the wall of the fixed tube 9 and a limit stop pin secured in the wall of the movable tube 12 and slidably fitted in the slot 13 to serve the purpose of defining the range of sliding movement of the movable tube 12 relative to the fixed tube 9. A coiled compression spring 15 is mounted inside the fixed tube 9 and is anchored at its opposite ends to the fixed and movble tubes 9 and 12 to normally hold the movable tube 12 in extended position. Reference numeral 16 indicates a spring seat secured to the inside of the movable tube 12 to receive the adjacent end of coiled spring 15.

Arranged axially in the fixed tube 9 is a winder locking rod 17 which is normally urged toward the plug-receiving end 41 of the socket 4 by a coil spring 30, which is weaker than the spring 15.

A wire 18 is anchored at one end to the locking rod 17 through the intermediary of a slotted connecting tube 21, which is slidably fitted over the locking rod 17 and has an axially extending slot to receive a limit stop pin 22 secured to the locking rod 17 adjacent to the inner end thereof. The wire 18 is coupled at its other end to a winder locking pawl 19 (in a manner to be described later) for the purpose of transmitting movement of the locking rod 17 to the pawl 19.

The locking pawl 19 is in the form of a bell crank lever and is normally biassed by a tension spring 23 in a direction to engage a ratchet wheel 24 integrally secured to the belt winder 2. When the seat belt is not in use pawl 19 is held out of engagement with the ratchet wheel 24 under the bias of spring 15 acting through the locking rod 17, connecting tube 21, wire 18 and a dog 25 secured to wire 18 for seating engagement with the locking pawl 19, as seen in FIGS. 1 and 2. Reference numeral 26 indicates a safety hook for holding the locking pawl 19 in its disengaged position; numeral 27 indicates a dog secured to the wire 18 to serve the purpose of moving the safety hook 26 into and out of engagement with the locking pawl 19; numeral 28 indicates a spring normally biasing the safety hook 26 in a direction to engage the locking pawl 19; numeral 31 indicates an electric circuit for signalling the driver that the seat belt is not in use. The circuit 31 includes an electric power source 32, a warning lamp 33 and switches 34, 35 and 36 connected in the circuit in series with each other.

In this circuit arrangement, one of the switches therein, for example, switch 34 is arranged so as to be closed automatically when the driver is seated and another switch 35 is associated with the engine ignition switch (not shown) so as to be closed simultaneously therewith. Accordingly, the warning lamp 33 is lighted upon turning of the ignition switch to advise the driver to apply the seat belt around his body, the remaining switch 36 being normally held closed under the pressure of the winder locking pawl 19, as shown in FIG. 2.

In applying the seat belt 1 around his body, the driver pulls out the seat belt and inserts the buckle plug 3 into the socket 4, thereby to force the movable tube 12 inwardly against the bias of the coiled springs 30 and 15 until the stop pin 14 reaches the inner end of the axially extending slot 13 in the fixed tube 9, as shown in FIG. 3. On this occasion, the winder locking rod 17 is retracted i.e., forced inwardly under the pressure of plug 3, and the stop pin 22 is displaced to the inner end of the slot 20 in the connecting tube 21 thereby forcing the tube 21 to move inwardly. As a result, wire 18 extending from the tube 21 is moved longitudinally to the left as viewed in the drawings. Incidentally, in case the spring 29 biasing the buckle-locking lever 5 is stronger than the springs 30 and 15, the buckle plug and socket members 3 and 4 are engageable with each other only after the movable tube 12 has been fully pushed in.

Figure 4:
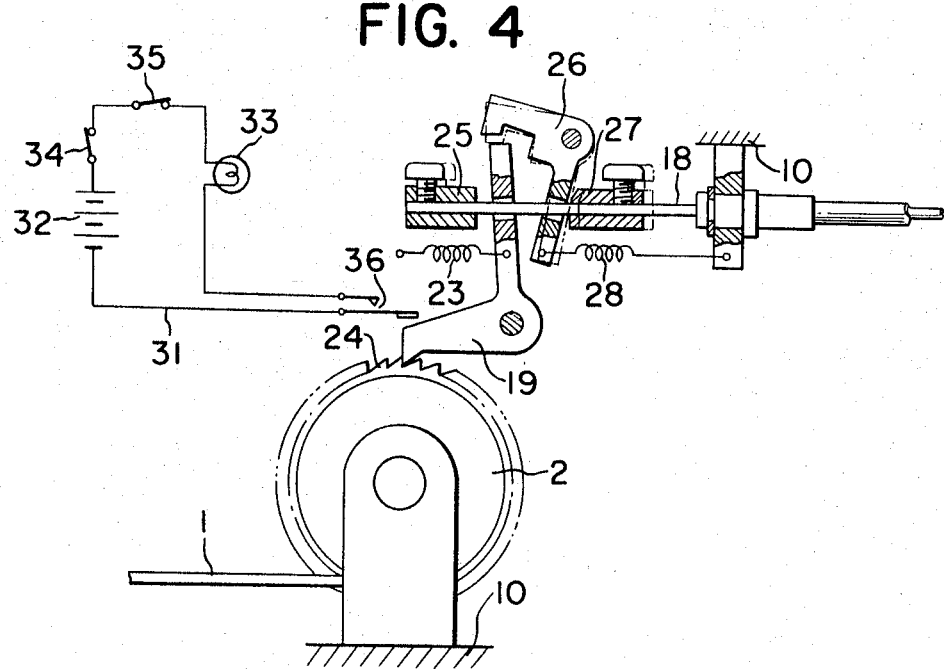
FIG. 4 is a view similar to FIG. 2, showing the winder portion of the device in the state corresponding to the buckle state shown in FIG. 3.

As seen clearly in FIG. 4, the leftward movement of the wire 18 causes the safety hook 26 to turn clockwise under the pressure of dog 27, which is secured to the wire, and thus the locking pawl 19 is released and brought into engagement with the ratchet wheel 24 under the tension of spring 23 thereby to lock the automatic belt winder 2 against rotation. At the same time, the switch 36, previously held closed by the locking pawl 19, is released and opens, and the warning lamp 33 is extinguished.

Figure 5:
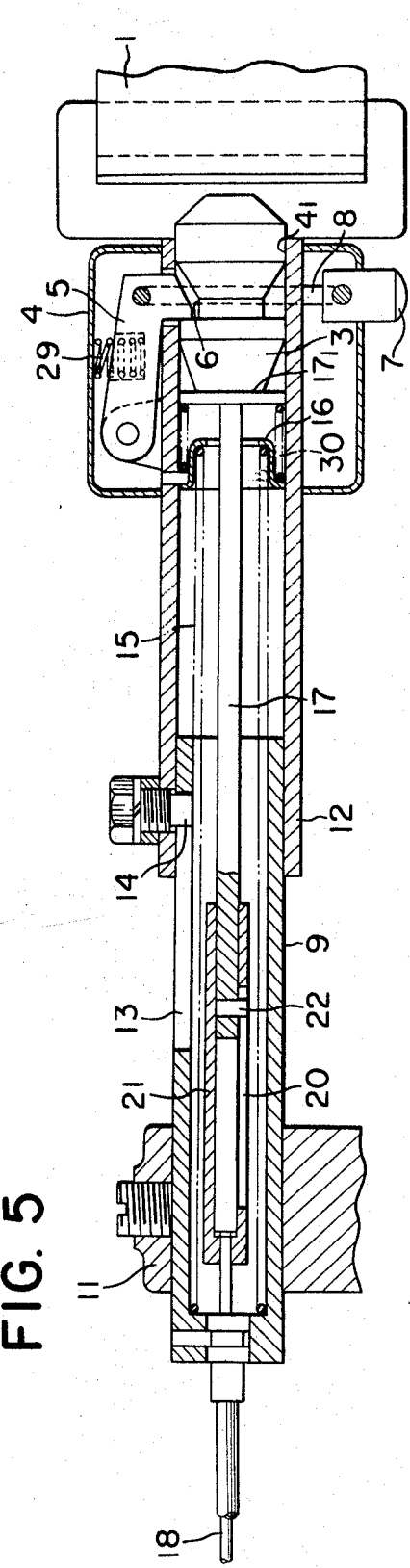
FIG. 5 is a view similar to FIGS. 1 and 3, showing the buckle in the state assumed after the seat belt has been completely applied.

Subsequently, when the driver's hands are removed from the buckle 3-4, the movable tube 12 is extended under the bias of spring 15 until the stop pin 14 reaches the forward or outer end of the slot 13, as shown in FIG. 5, and thus the seat belt 1 is given a slack corresponding to the length of slot 13. The slot 13 and pin 14 thus serve as a lost motion means to slacken the seat belt after the buckles 3, 4 have been engaged together and subsequently released from manual engagement. Though such restoring movement of the movable tube 12 naturally allows the locking rod 17 to move together therewith, the locking rod 17 cannot reach its original position as it is restrained by the plug 3, which is in pressure contact with the outer face $17_1$ of the locking rod 17, and the pin 22 carried thereon cannot reach the outer end of the slot 20 formed in the connecting tube 21. It is to be noted that such limited movement of the locking rod 17, exerts no pulling effect upon the wire 18 but merely allows it to be slightly moved back by the safety hook 26 through the dog 27 secured to the wire as the safety hook 26 rocks to engage the locking pawl 19 under the bias of the spring 28, as shown by the dotted lines in FIG. 4.

Figure 6:
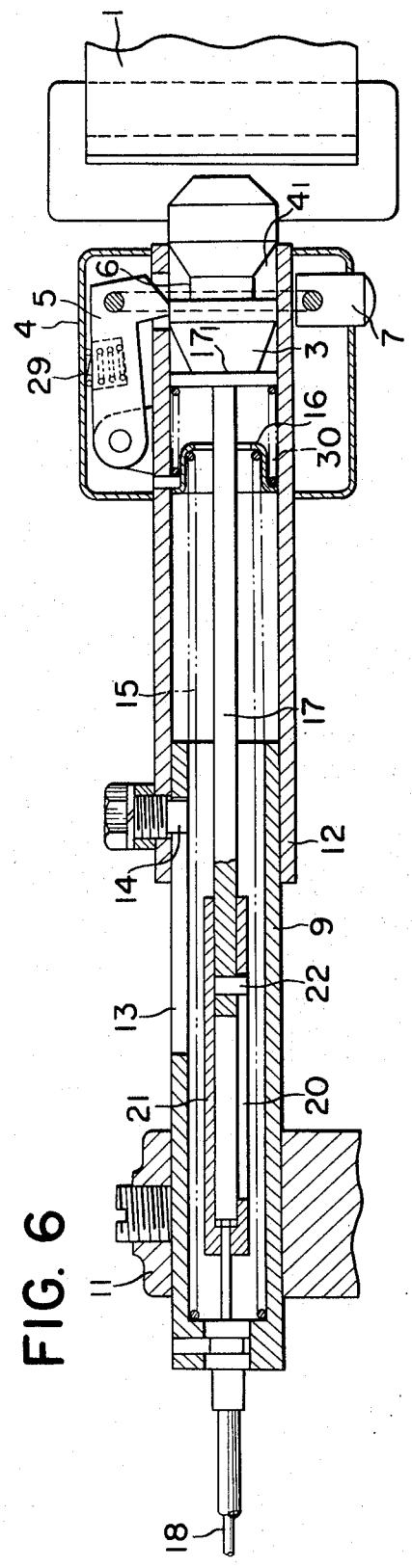
FIG. 6 is a view similar to FIGS. 1, 3 and 5, showing the buckle structure unlocked by a push button means.

When the push button 7 is depressed by the driver for disconnecting the safety belt, the buckle 3–4 is unlocked as described hereinbefore, allowing the locking rod 17 to return to its original position under the bias of spring 30. This causes the stop pin 22 secured to the locking rod 17 to engage the forward or outer end wall of the slot 20, as shown in FIG. 6, and to pull back the wire 18. In this manner, the dog 25 secured to the wire is brought into engagement with the locking pawl 19 to turn the latter out of engagement with the ratchet wheel 24 and thus the belt winder 2 is released to wind up the now unbuckled seat belt 1.

It will be apparent from the foregoing description that there is provided a self-retracting type seat belt device wherein when buckling the seat belt, or after it has been applied around the user's body, the buckle is manually pushed in thereby to pull out the seat belt a predetermined additional length, the belt winder is automatically locked and the seat belt obtains an appropriate amount of slack when the buckle is released and returns to its previous position. It will readily be appreciated that such device can be used with ease and comfort since the applied seat belt imparts no pressure to the user's body despite the self-retracting nature of the device and thus is highly advantageous for use in automobiles, trucks and the like.

While one preferred embodiment of the invention has been shown and described, it will be apparent to those skilled in the art that various changes and modifications may be made therein without departing from the spirit and scope of the claimed invention.

What is claimed is:

1. A seat belt device for vehicle use comprising a seat belt, a belt winder connected to said seat belt to urge the belt to retracted position, buckle means including a first buckle member secured to a free end of the seat belt, and a second buckle member engageable with the first buckle member and supported from the vehicle for back and forth movement over a predetermined distance, spring means acting on the second buckle member to urge the same to a forwardly extended position, the second buckle member being retractable against the opposition of the spring means under the pressure of the first buckle member when the buckle members are engaged, locking means coupled to the second buckle member to lock the belt winder when the first buckle member is engaged with the second buckle member and the seat belt has been previously pulled out around the user's body, said second buckle member including lost motion means for slackening the seat belt after the buckle members have been engaged and subsequently released from manual engagement.

2. A seat belt device as claimed in claim 1 comprising an electrical circuit including a signal means for indicating lack of engagement of the buckle members.

3. A seat belt device as claimed in claim 2 comprising means connected to said second buckle member for opening said circuit when said buckle members have been engaged together.

4. A seat belt device as claimed in claim 1 wherein said second buckle member comprises a tubular member, and means within said tubular member coupled to said locking means for operating the latter when the buckle members are engaged and the second buckle member is retracted under the pressure of the first buckle member.

5. A seat belt device as claimed in claim 4 wherein said lost motion means comprises a pin and slot connection between the tubular member and the vehicle.

6. A seat belt device as claimed in claim 4 wherein said means for operating said locking means comprises a displaceable rod, a tube within said tubular member and slidably receiving said rod, said tube and rod having a pin and slot connection, and means operatively connecting the locking means and tube.

7. A seat belt device as claimed in claim 6 wherein said locking means comprises a pivotally mounted pawl lever, said belt winder including a ratchet wheel facing said pawl lever to be locked thereby when the buckle members are engaged and the second buckle member is retracted.

8. A seat belt device as claimed in claim 7 comprising means for locking said pawl lever in disengaged position from said ratchet wheel, and means for releasing the pawl lever when the buckle members are engaged and the second buckle member is retracted.

9. A seat belt device as claimed in claim 7 comprising releasable locking means between said buckle members.

10. A seat belt device as claimed in claim 7 comprising an electrical circuit including a signal means for indiating lack of engagement of the buckle members, said circuit including a switch means facing said pawl lever for being opened when the pawl lever is engaged with the ratchet wheel and closed when the pawl lever is disengaged from the ratchet wheel.

* * * * *